United States Patent [19]

Neuman et al.

[11] Patent Number: 4,978,206
[45] Date of Patent: Dec. 18, 1990

[54] PERISCOPIC SIGHT WITH SUPPORT MEANS FOR ELEVATION ADJUSTMENT MOUNTED WITHIN SUPPORT MEANS FOR AZIMUTHAL ADJUSTMENT

[75] Inventors: Benzion Neuman, Moshav Hemed; Benjamin Shnarch, Bat Yam, both of Israel

[73] Assignee: Israel Aircraft Industries, Ltd., Israel

[21] Appl. No.: 384,717

[22] Filed: Jul. 25, 1989

[30] Foreign Application Priority Data

Aug. 2, 1988 [IL] Israel ............................... 87305

[51] Int. Cl.$^5$ .................... G02B 23/08; G02B 23/16
[52] U.S. Cl. ............................... 350/543; 89/36.14
[58] Field of Search ............... 350/543, 544, 540, 539; 89/36.14

[56] References Cited

U.S. PATENT DOCUMENTS

| 1,341,683 | 6/1920 | Styll | 350/543 |
| 2,390,516 | 12/1945 | Crawford | 89/36.14 |
| 2,546,111 | 3/1951 | Rattray | 350/539 |
| 3,493,296 | 2/1970 | Albert | 89/36.14 |
| 3,602,088 | 8/1971 | Spring | 350/540 |

FOREIGN PATENT DOCUMENTS

| 2926973 | 1/1981 | Fed. Rep. of Germany | 89/36.14 |
| 2419496 | 11/1979 | France | 89/36.14 |
| 2593612 | 7/1987 | France | 350/540 |
| 2072810 | 10/1981 | United Kingdom | 89/36.14 |

Primary Examiner—Jon W. Henry
Attorney, Agent, or Firm—Darby & Darby

[57] ABSTRACT

A periscopic sight comprising a base having a mounting aperture defining a first axis, first support apparatus mounted in association with the mounting aperture for rotation therein about the first axis, second support apparatus mounted in association with the first support apparatus and defining a second axis substantially perpendicular to the first axis and a periscope passing through the mounting aperture and defining a longitudinal axis coincident with the first axis and mounted within the second support apparatus for rotation about the second axis between predetermined limits.

20 Claims, 4 Drawing Sheets

PERISCOPIC SIGHT WITH SUPPORT MEANS FOR ELEVATION ADJUSTMENT MOUNTED WITHIN SUPPORT MEANS FOR AZIMUTHAL ADJUSTMENT

FIELD OF THE INVENTION

The present invention relates in general to periscopic sights and, in particular, to periscopic sights for use in tanks.

BACKGROUND OF THE INVENTION

Modern tanks are generally equipped with a cannon provided with a periscopic sight and a machine-gun, which may also be provided with a periscopic sight. It is generally accepted as a principle of tank design that appurtenances, such as sights, should protrude as little as possible above the tank in order to reduce the risk of detection by an enemy.

Conventional periscopic sights generally include first and second opposing, parallel, reflective surfaces arranged along an optical axis passing through an elongate housing. The housing defines a window associated with the first reflective surface and an eyepiece associated with the second reflective surface. A beam of light entering the periscope through the window strikes the first surface and is deflected along the optical axis onto the second surface and out through the eyepiece. In the instance of a periscopic sight used in conjunction with tank machine-gun, the periscope housing is usually mounted for axial rotation at right-angles to a plane defined by the tank turret and is mechanically 'enslaved' to the machine-gun.

Therefore, when the machine-gun is partially rotated in a plane of movement parallel to the plane defined by the tank turret, the periscope is rotated accordingly so as to provide a line of sight parallel to the direction in which the machine-gun is aimed.

The first and second reflective surfaces may be defined either by prisms or by mirrors. Where the first reflective surface is defined by a mirror, there may also be provided apparatus for tilting it relative to the line of sight, this apparatus also including electronic apparatus for coordinating the tilting of the mirror with a change in the degree of tilt of the machine-gun relative to the plane of movement.

It has been found that rotation of the first surface through an angle 'a' while maintaining the second surface in a fixed orientation is effective to change the line of sight by 2a. It will, however, be appreciated that as the first surface is tilted, the optical axis is also tilted and that its respective points of intersection with the two optical surfaces move. Therefore, geometrical constraints, related to the size of the reflective surfaces and to the extent to which it is desirable to minimize the height of protrusion of the sight above the tank limit the extent to which a system employing a tiltable first mirror can move the line of sight.

In the field of periscopic sights for tank cannons. wherein the sight is 'enslaved' to the cannon in a way similar to the enslavement of a machine-gun sight to a machine-gun, the periscopic sights respectively enslaved to the cannon and to the machine-gun are generally connected to their respective weapons in a way that does not facilitate quick and convenient disconnection of the machine-gun sight from the machine-gun, disconnection of the cannon sight from the cannon and connection of the machine-gun sight to the cannon. This would be particularly useful upon failure of the cannon sight under battle conditions.

SUMMARY OF THE INVENTION

It is the aim of the present invention to provide a periscopic sight facilitating a relatively large tilt in the line of sight.

It is also an aim of the present invention to provide a periscopic sight which may be quickly and conveniently disconnected from a weapon to which it is enslaved and quickly and conveniently reconnected thereto or connected to an adjacent weapon.

There is provided, therefore, in accordance with an embodiment of the invention, a periscopic sight comprising a base having a mounting aperture defining a first axis, first support apparatus mounted in association with the mounting aperture for rotation therein about the first axis, second support apparatus mounted in association with the first support apparatus and defining a second axis substantially perpendicular to the first axis and a periscope passing through the mounting aperture and defining a longitudinal axis mounted within the second support apparatus for rotation about the second axis between predetermined limits.

Additionally in accordance with an embodiment of the invention, the first support apparatus comprises an annular member and the second support apparatus comprises periscope mounts lying along the second axis.

Further in accordance with an embodiment of the invention, the predetermined limits of partial rotation are defined by first and second inward-facing surfaces of the annular member.

Additionally in accordance with an embodiment of the invention, the periscope comprises an elongate housing having a window and an eyepiece located at opposite ends thereof and first and second reflective surfaces respectively associated with the window and the eyepiece and arranged in the housing such that a beam of radiation passing through the window along a first optical axis is deflected by the first reflective surface towards said second reflective surface and deflected from the second reflective surface through the eyepiece along a second optical axis.

Further in accordance with an embodiment of the invention, the first reflective surface is defined by a partially rotatable mirror and the second reflective surface has a fixed position with respect to the elongate housing, the periscopic sight also including apparatus for selectively rotating the mirror between first and second predetermined positions wherein, in the first position, the mirror is substantially parallel to the second reflective surface such that the first and second optical axes are substantially parallel, whereas in the second position, the mirror is not parallel to the second reflective surface in the second position and the first and second optical axes are not parallel.

Additionally in accordance with an embodiment of the invention, the periscopic sight is enslaved to a weapon support mounted for rotation about a third axis parallel to the first axis, the weapon support also being tiltable in relation to the third axis.

Further in accordance with an embodiment of the invention, the periscopic sight is enslaved to the weapon support by means of an elongate member connected by means of first and second end connections to the sight and the weapon support.

Additionally in accordance with an embodiment of the invention, the elongate member comprises a connecting rod onto each end of which there is fixed a substantially spherical member and each of the first and second end connections comprises apparatus associated with each of the sight and the weapon support for locking the spherical member at three points.

Further in accordance with an embodiment of the invention, the apparatus for locking comprises a base defining a socket in a peripheral surface of which there is provided a shaped notch for receiving said spherical member, the shaped notch thus defining two of the three points; and a locking member associated with the base and selectably operable to apply a force onto the spherical member in the direction of the shaped notch so as to define the third of the three points and such that the spherical member becomes locked between the locking member and the shaped notch.

BRIEF DESCRIPTION OF THE DRAWINGS

The present invention will be more fully understood and appreciated from the following detailed description taken in conjunction with the drawings, in which.

DETAILED DESCRIPTION OF THE INVENTION

Figure 1:
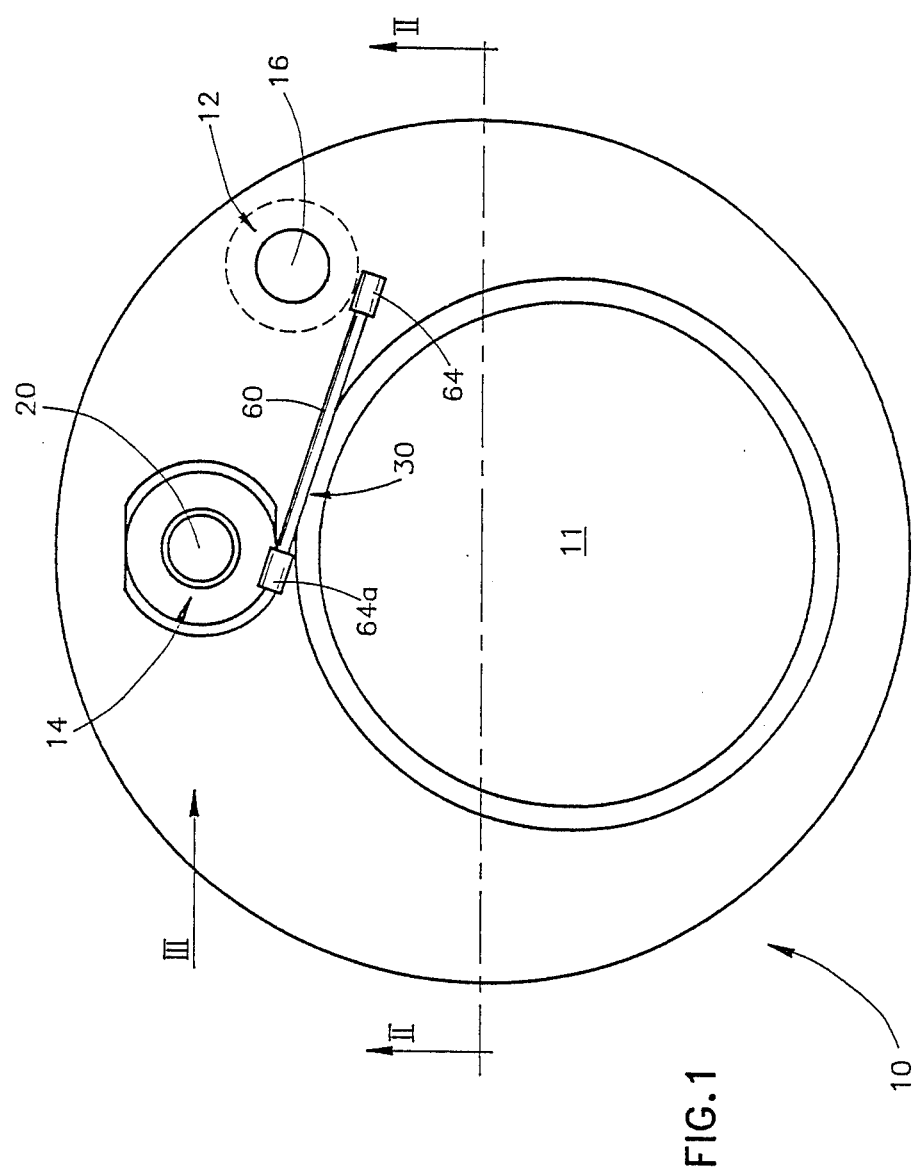
FIG. 1 is a plan view illustration of a tank turret together with a machine-gun and a periscopic sight associated therewith constructed and operative in accordance with a preferred embodiment of the invention and taken along line I—I in FIG. 2.
Figure 2:
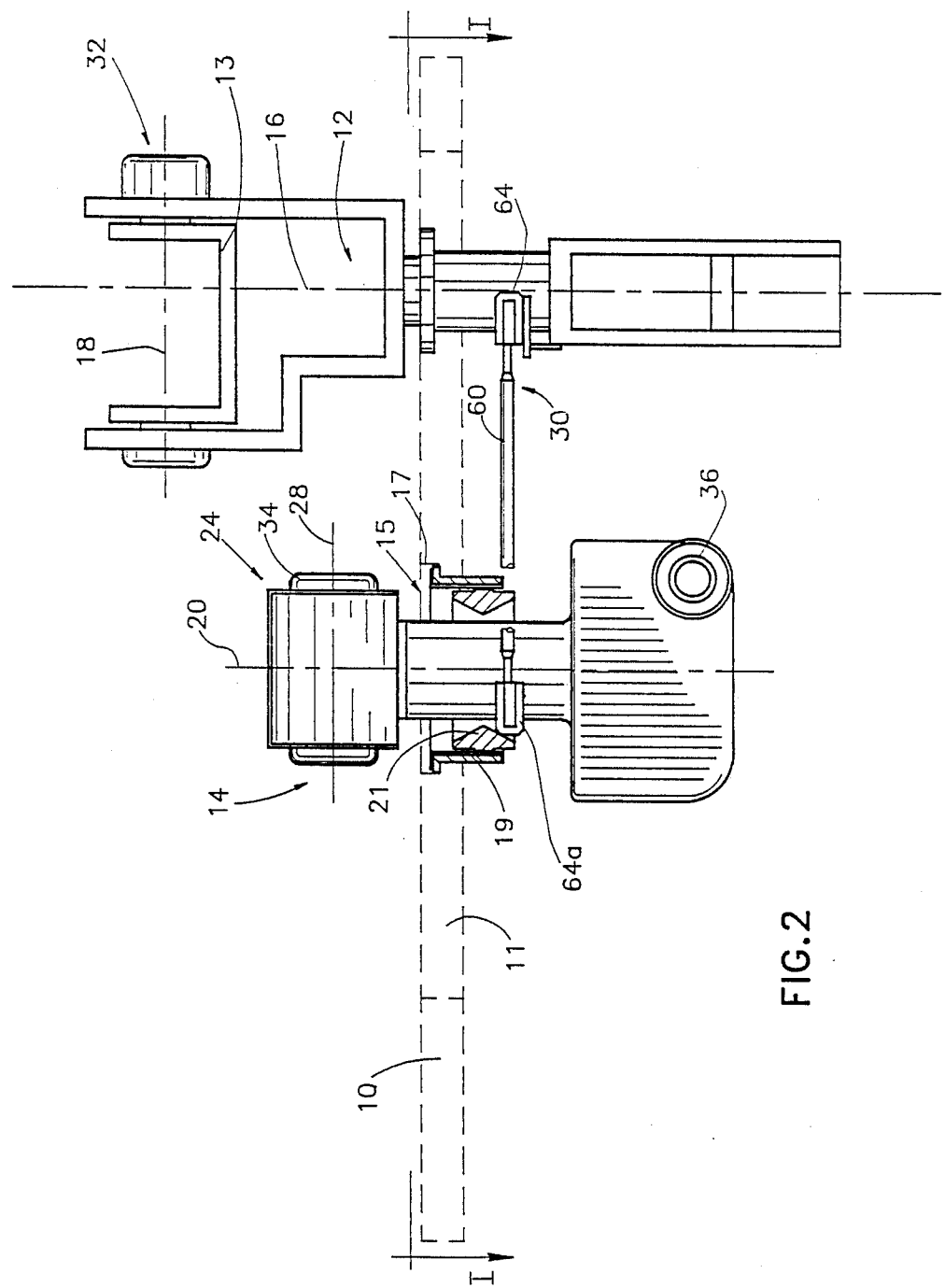
FIG. 2 is a view of the apparatus of FIG. 1 taken along line II—II therein.

Reference is made to FIGS. 1 to 3B, in which there is shown a tank turret 10 on which there is mounted a machine-gun support 12 (FIGS. 1 and 2) with which is associated a periscopic sight 14. Machine-gun support 12 is mounted for rotation about a first rotation axis 16 substantially perpendicular to the plane defined by turret 10. Rotation of support 12 about axis 16 is effective to rotate the line of sight of the machine-gun (not shown) in a plane parallel to turret 10. Support 12 also includes a machine-gun support bracket 13 (FIG. 2) which is mounted for tilting about a first tilt axis 18 which is operative to change the angular elevation of the line of sight in relation to the plane parallel to the turret.

Figure 3A:
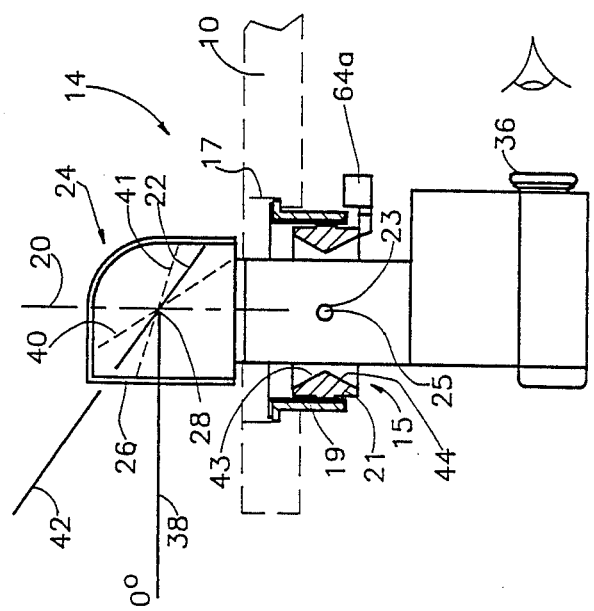
FIG. 3A is a view, taken along line 111—111 in FIG. 1. wherein the sight is in a non-tilted position.

Periscopic sight 14 is mounted for rotation about a second rotation axis 20 by means of a support assembly 15 (FIGS. 2, 3A and 3B) mounted within an aperture 17 of turret 10. Support assembly 15 comprises a first annular member 19 fixedly seated in aperture 17, a second annular member 21 arranged for rotation relative to the first annular member, about axis 20 and mounts 23 defining a tilt axis 25, parallel to the plane defined by turret 10 and about which sight 14 may be selectably tilted, as described hereinbelow. Second rotation axis 20 is parallel to first axis 16 when sight 14 is an a non-tilted position as shown in FIG. 3A. A mirror 22, is mounted within housing 24 in optical association with a window 26 for tilting about a second tilt axis 28, parallel to first axis 18.

Sight 14 is rotationally 'enslaved' to machine-gun support 12 by means of a mechanical connection 30, which is operative to maintain rotational alignment between support !2 and sight 14 about respective first and second rotation axes 16 and 20. Sight 14 is further enslaved to support 12 by means of an electro-mechanical connection between support 12 and mirror 22, this connection typically being constituted by first and second angular resolvers mounted in respective association with support 12 and sight 14 at respective locations 32 and 34 (FIG. 2) and including data processing circuitry (not shown) connecting between the first and second resolvers.

According to the present invention, a reflective surface (not shown) mounted within housing 24 in optical association with an eyepiece 36 is fixed in parallel alignment with a 'datum' position of mirror 22, indicated by a solid line. When sight 14 is in an upright position, as shown in FIG. 3A and mirror 22 is in its datum position, the line of sight, as shown at 38, is at zero degrees. As mirror 22 is thus rotated, as the reflective surface associated with the eyepiece is fixed, a given change in the angular orientation of mirror 22 produces an elevation in the line of sight by an angle twice that through which mirror 22 is rotated.

According to a preferred embodiment of the invention. 22 may be rotated in a chosen direction about axis 28 by a maximum of typically 22.5 degrees, as shown by dotted line 40 (FIG. 3A), causing a change in the line of sight of substantially 45 degrees, to the position shown at 42.

It may, however, be required to raise the line of sight by up to, for example, 65 degrees, which is greater than the angular elevation of the line of sight that may be achieved by simply tilting mirror 22. This, as described, is typically only 45 degrees. It is, therefore, a feature of the invention that the entire sight 14 may be tilted about axis 25 to lie in a position defined by inward-facing sloped surfaces 42 and 44 of second annular member 21. According to the shown embodiment. surfaces 42 and 44 combine to limit the maximum degree of tilt of sight !4 to 20 degrees.

Figure 3B:
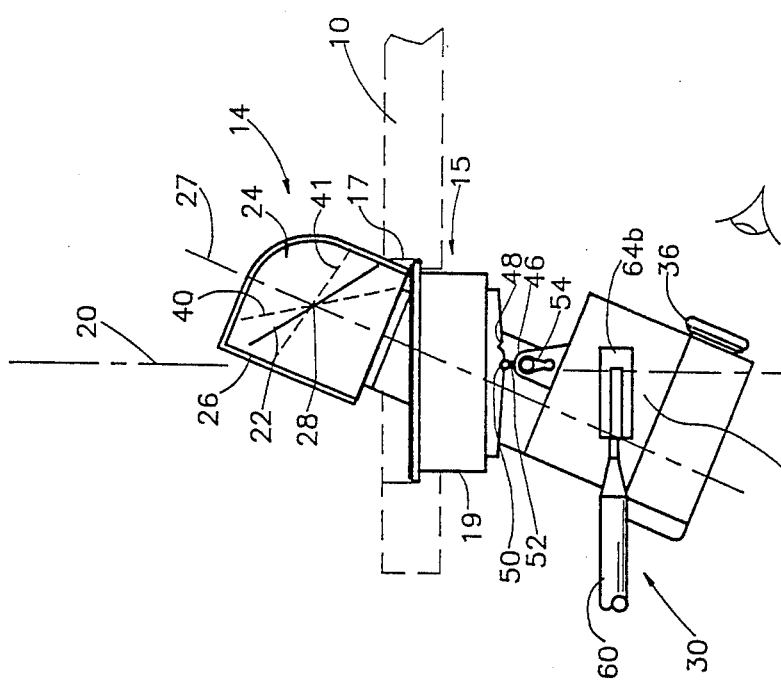
FIG. 3B is a view similar to that shown in FIG. 3A but wherein the sight is in a tilted position.

There is provided a two-position locking mechanism 46 (FIG. 3B) which is operative to engage one of indentations 48 and 50 formed in a downwardly extending portion of first annular member 19. Engagement of locking mechanism 46 with indentation 48 is operative to maintain sight 14 in an upright position, as shown in FIG. 3A, while engagement of locking mechanism 46 with indentation 50 is operative to maintain sight 14 in a position tilted by 20 degrees, as shown at 51 (FIG. 3B).

According to an alternative embodiment of the invention, there may be provided a plurality of indentations similar to indentations 48 and 50. representing intermediate tilt positions.

In operation, as locking mechanism 46 is moved from engagement with indentation 48 to engagement with indentation 50 or vice versa, a signal is sent (by means not shown) to the data processing circuitry associated with the angular resolvers so as to rotate mirror 22 to a position whereat the line of sight prior to moving locking mechanism is substantially maintained. This prevents the occurrence of a 'jump' in the line of sight, which would otherwise happen and which may cause a target to be lost from sight.

Selector 46 may be any suitable mechanism but, according to the present invention, it comprises a spring-retained locking member 52 which is normally engaged with an adjacent one of indentations 48 and 50 and it may be released therefrom by pulling a handle portion 54 in a generally downward direction.

It will be appreciated by persons skilled in the art that although the present invention is shown and described in relation to a tank, this is by way of example only and is not intended to limit the use of the present invention to use in the described context.

Particular reference is now made to FIG. 1. As stated above, sight 14 is enslaved, in a plane of rotation substantially parallel to turret 10, by a mechanical connector 30. As will be known to persons skilled in the art, there is also provided a periscopic sight (not shown) for the main cannon (not shown) of a tank.

It is an aim of the present invention that connector 30 be quickly disconnectable from support 12 and connectable to a cannon support (not shown). such as would be useful if the cannon sight were to fail under battle conditions.

Figure 4:
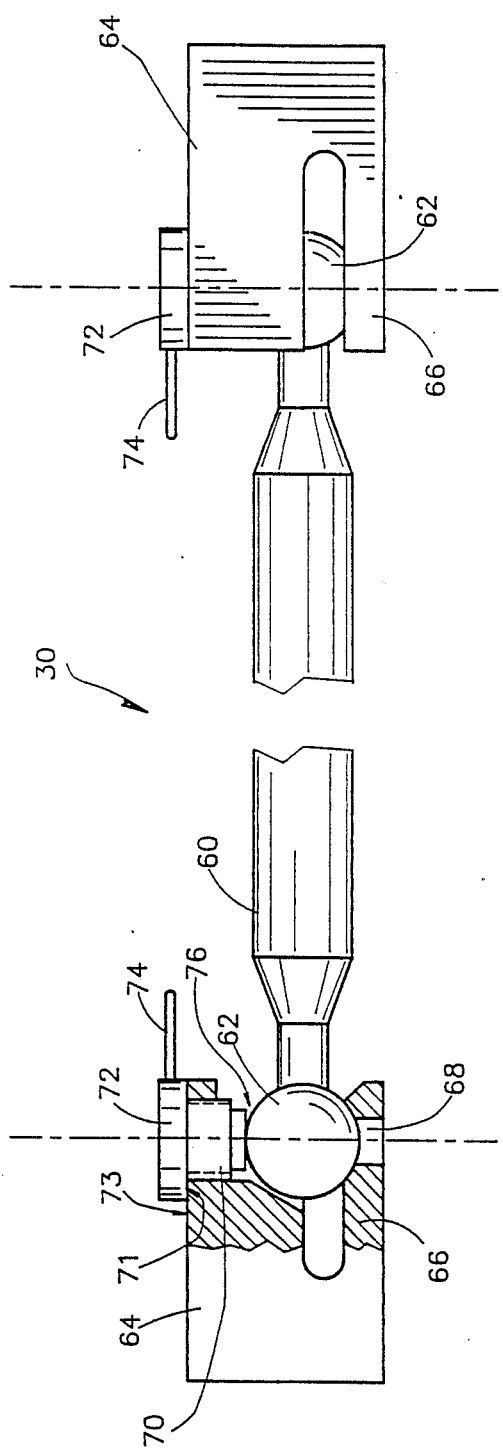
FIG. 4 is a schematic. partially cut-away illustration of a quick release connector useful in conjunction with the apparatus of FIG. 1.

With additional reference to FIG. 4, connector 30 is shown, constructed according to a preferred embodiment of the invention. Connector 30 comprises a metal rod 60 having a locking ball 62 fixed to each end. Each locking ball 62 is made typically of 63 RC steel according to AISI 52100. There are also provided a pair of identical bases 64 which are associated with sight 14 and machine-gun support 12. Each base 64 is formed typically of brass and defines a cantilevered portion 66 defining a tapered notch 68 for receiving locking ball 62. Preferably, notch 68 is conical.

A bore 70 is provided opposite notch 68 and is formed so as to screwably receive a screw member 72, formed typically of 63 RC steel according to AISI 52100. In operation, after locking ball 62 has been inserted into base 64 and seated in notch 68, screw member 72 is tightened, with the aid of a handle 74, so as to retain ball 62 within base 64. It will be appreciated that as ball 62 is locked between a point 76, defined at the end of screw member 72 and a circle, defined between notch 68 and the ball. although it has substantial rotational freedom, a high precision connection is created between base 64 and metal rod 60. It will also be appreciated that the connection and disconnection of connector 30 is convenient and relatively quick.

If required, therefore. connector 30 may easily be disconnected from machine-gun support 12 and connected to the cannon support (not shown). In such a situation, locking mechanism 46 may be disengaged from indentations 48 and 50 and sight 12 becomes operative to tilt freely in accordance with tilting of the cannon. tilting either in a clockwise or counterclockwise direction about axis 25.

It will be appreciated by persons skilled in the art that the present invention is not limited by what has been shown and described hereinabove. The scope of the present invention is defined, rather, solely by the claims, which follow.

We claim:

1. A periscopic sight comprising:
    a base having a mounting aperture defining a first axis,
    first support means mounted in association with said mounting aperture for rotation therein about said first axis, said first support means permitting azimuthal rotation and defining a second axis substantially perpendicular to said first axis;
    second support means mounted in said first support means and rotating about said second axis said second support means permitting movement in elevation; and
    a periscope extending through said mounting aperture, defining a longitudinal axis and mounted within said second support means for rotation about said second axis between predetermined limits and about said first axis.

2. A periscopic sight according to claim 1, and wherein said first support means comprises an annular member.

3. A periscopic sight according to claim 2. and wherein said second support means comprises periscope mounts lying along said second axis.

4. A periscopic sight according to claim 3, and wherein said predetermined limits of partial rotation are defined by first and second inward-facing surfaces of said annular member.

5. A periscopic sight according to claim 1, and wherein said periscope comprises:
    an elongate housing having a window and an eyepiece located at opposite ends thereof and
    first and second reflective surfaces respectively associated with said window and said eyepiece and arranged in said housing such that a beam of radiation passing through said window along a first optical axis is deflected by said first reflective surface towards said second reflective surface and deflected from said second reflective surface through said eyepiece along a second optical axis.

6. A periscopic sight according to claim 5, and wherein said first reflective surface is defined by a partially rotatable mirror and said second reflective surface has a fixed position with respect to said elongate housing, said periscopic sight also including means for selectively rotating said mirror between first and second predetermined positions wherein, in said first position, said mirror is substantially parallel to said second reflective surface such that said first and second optical axes are substantially parallel, whereas in said second position, said mirror is not parallel to said second reflective surface in said second position and said first and second optical axes are not parallel.

7. A periscopic sight and weapon support combination, wherein said periscopic sight is enslaved to said weapon support and comprises:
    a base having a mounting aperture defining a first axis,
    first support means mounted in association with said mounting aperture for rotation therein about said first axis, said first support means permitting azimuthal rotation and defining a second axis substantially perpendicular to said first axis;
    second support means mounted in said first support means and rotating about said second axis, said second support means permitting movement in elevation; and
    a periscope extending through said mounting aperture, defining a longitudinal axis and mounted within said second support means for rotation about said second axis between predetermined limits and about said first axis.

8. A combination according to claim 7, and wherein said first support means comprises and annular member.

9. A combination according to claim 8, and wherein said second support means comprises periscope mounts lying along said second axis.

10. A combination according to claim 9, and wherein said predetermined limits of partial rotation are defined by first and second inward-facing surfaces of said annular member.

11. A combination according to claim 7, and wherein said periscope comprises:
an elongate housing having a window and an eyepiece located at opposite ends thereof and
first and second reflective surfaces respectively associated with said window and said eyepiece and arranged in said housing such that a beam of radiation passing through said window along a first optical axis is deflected by said first reflective surface towards said second reflective surface and deflected from said second reflective surface through said eyepiece along a second optical axis.

12. A combination according to claim 11 and wherein said first reflective surface is defined by a partially rotatable mirror and said second reflective surface has a fixed position with respect to said elongate housing, said periscopic sight also including means for selectively rotating said mirror between first and second predetermined positions wherein, in said first position, said mirror is substantially parallel to said second reflective surface such that said first and second optical axes are substantially parallel, whereas in said second position. said mirror is not parallel to said second reflective surface in said second position and said first and second optical axes are not parallel.

13. A combination according to claim 7, and wherein said weapon support is mounted for rotation about a third axis parallel to said first axis, said weapon support also being tiltable in relation to said third axis.

14. A combination according to claim 13, and wherein said periscopic sight is enslaved to said weapon support by means of an elongate member connected by means of first and second and connections to said sight and said weapon support.

15. A periscopic sight and weapon support combination, wherein said periscopic sight is enslaved to said weapon support and comprises:
a base having a mounting aperture defining a first axis,
first support means mounted in association with said mounting aperture for rotation therein about said first axis, said first support means defining a second axis substantially perpendicular to said first axis;
second support means mounted in said first support means and rotating about said second axis; and
a periscope extending through said mounting aperture, defining a longitudinal axis and mounted within said second support means for rotation about said second axis between predetermined limits and about said first axis,
wherein said weapon support is mounted for rotation about a third axis parallel to said first axis, said weapon support also being tiltable in relation to said third axis, and
wherein said periscopic sight is enslaved to said weapon support by means of an elongate member connected by means of a first and second end connection to said sight and said weapon support,
and wherein said elongate member comprises a connecting rod onto each end of which there is fixed a substantially spherical member and means associated with each of said sight and said weapon support for locking said spherical member.

16. A combination according to claim 15, wherein said spherical member is locked at at least three points, and said means for locking comprises:
a base defining a socket in a peripheral surface of which there is provided a shaped notch for receiving said spherical member, said shaped notch thus defining two of said at least three points; and
a locking member associated with said base and selectably operable to apply a force onto said spherical member in the direction of said shaped notch so as to define the third of said at least three points and such that said spherical member becomes locked between said locking member and said shaped notch.

17. A combination according to claim 16, and wherein said base defines a cantilevered member and said shaped notch is defined thereby.

18. A combination according to claim 16, and wherein said shaped notch is tapered.

19. A combination according to claim 18, and wherein said shaped notch is conical.

20. A combination according to any of claims 7 to 19, and wherein said sight is also enslaved to said weapon support such that said periscope is operative to be rotated so as to be directed in parallel alignment with said weapon support with respect to the tilt thereof relative to said third axis.

* * * * *